Nov. 24, 1959 H. E. TENDLER 2,913,953
ANCHOR BOLT WITH DRIVE MEANS FOR FORMING A HOLE
Filed Nov. 1, 1956
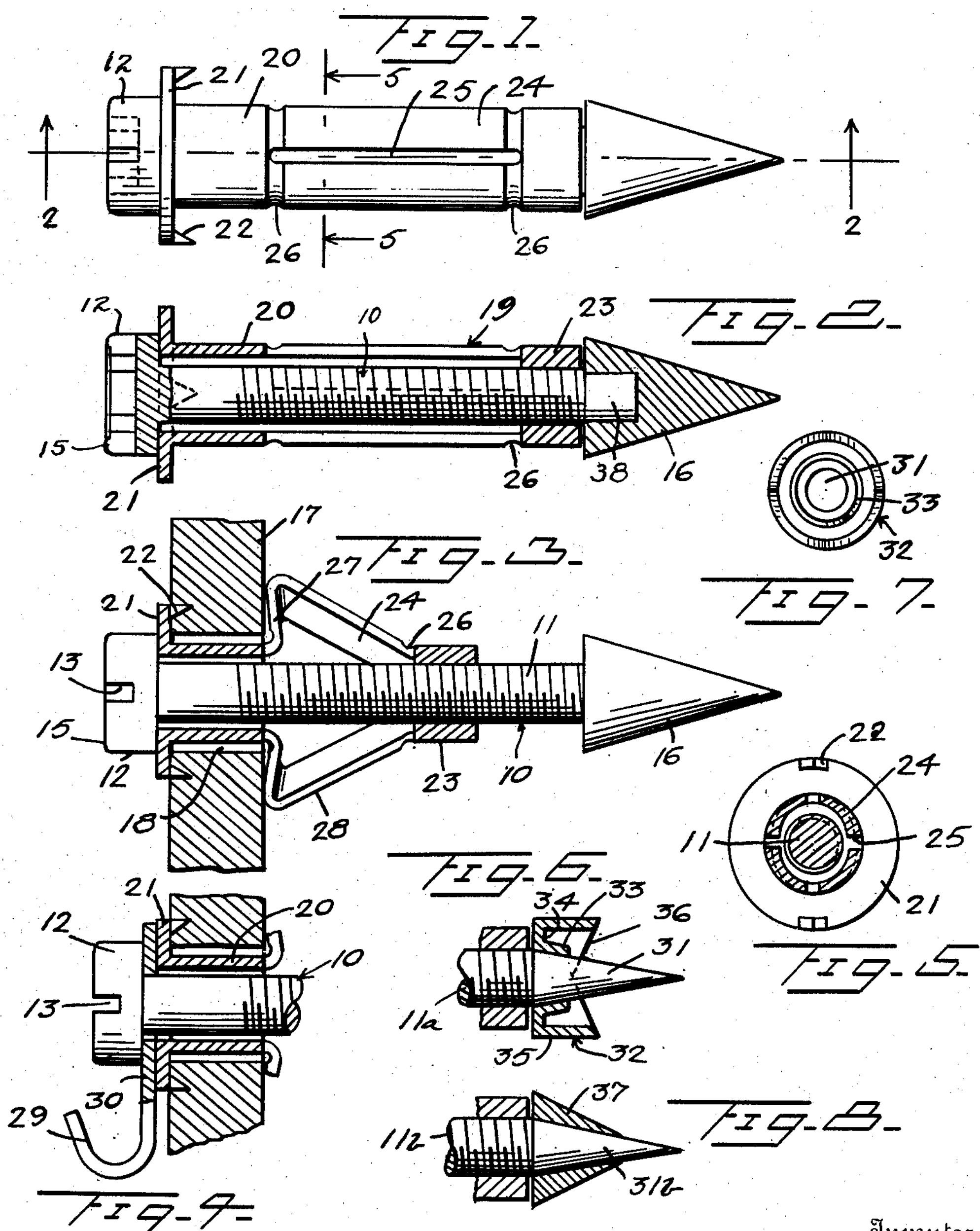
Witnesses
Inventor
Helen E. Tendler
By C.A.Snow & Co.
Attorneys.

United States Patent Office 2,913,953

Patented Nov. 24, 1959

2,913,953

ANCHOR BOLT WITH DRIVE MEANS FOR FORMING A HOLE

Helen E. Tendler, St. Louis, Mo.

Application November 1, 1956, Serial No. 619,837

1 Claim. (Cl. 85—40)

This invention relates to anchor bolts.

An object of this invention is to provide an anchor bolt embodying a wall piercing point and a distortable anchor which may be initially driven through a wall and then firmly secured to the inner and outer sides of the wall.

Another object of this invention is to provide an anchor bolt which is of simple construction so that it can be made at low cost.

A further object of this invention is to provide an anchor bolt which includes means whereby the anchor or nut portion thereof will be secured against rotation while the bolt is being rotated to effect distortion of the anchor.

A further object of this invention is to provide an anchor bolt embodying a hole forming element so that the bolt will form a clean hole in the wall.

A further object of this invention is to provide an anchor bolt having a conical wall piercing point threaded on the outer end thereof with a longitudinally split cylindrical anchor loose on the bolt between the bolt head and the point, and with the inner end of the anchor threaded onto the bolt, so that turning of the bolt in one direction will effect distortion of the anchor on the inner side of the wall whereby the anchor will tightly bind against the inner and outer sides of the wall.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings:

Figure 1 is a detail side elevation of an anchor bolt constructed according to an embodiment of this invention.

Fig. 2 is a longitudinal section taken on line 2—2 of Fig. 1.

Fig. 3 is a longitudinal section showing the anchor in operative position.

Fig. 4 is a fragmentary sectional view showing a supporting element mounted on the outer end of the bolt.

Fig. 5 is a sectional view taken on line 5—5 of Fig. 1.

Fig. 6 is a fragmentary longitudinal section showing a modified form of this invention.

Fig. 7 is an end view of the cutting cap shown in Fig. 6.

Fig. 8 is a fragmentary longitudinal section showing another modification of this invention.

Fig. 9 is a detail outer end elevation showing the head of the bolt.

Referring to the drawing, and first to Figs. 1 to 5, inclusive, the numeral 10 designates generally a threaded bolt having a threaded shank 11 with a head 12 at one end thereof. The head 12 is provided with a kerf 13 and is also provided with a socket 14 which is of polygonal shape to receive the polygonal end of a driver. The outer side of the head 12 is formed with a rounded rib 15, which will prevent overturning of the marginal edge of head 12 when struck with a hammer.

The shank 11 has pressed onto the forward end thereof a conical wall piercing point 16. The point 16 is adapted to be driven through a wall 17 and in passing through the wall 17, will form a hole 18. An anchor member generally indicated at 19 is loosely disposed about a shank 11 and comprises a cylindrical body 20 which is formed at its outer end with a flange or plate 21. A pair of tangs 22 project from the plate or flange 21 and are adapted as shown in Fig. 3, to pierce the outer side of the wall 17. The anchor member 19 is formed at its forward end with a cylindrical nut 23 which is threaded onto the shank 11 and is disposed in slight spaced relation to the base of the point 16 so that when the structure is driven through the wall 17, the anchor member 19 will not bind on the shank 11. The anchor member 19 is also formed with an intermediate distortable body 24 which is of cylindrical configuration in transverse section in the initial application of the device through the wall. The body 24 is formed with pairs of longitudinal slits 25 and at each end of body 24 there is formed an annular groove 26 which provides a weakened body portion to permit the bending of the split body portions 24 after the manner shown in Fig. 3. When the assembly is initially driven through the wall 17 the assembly will have the configuration shown in Figs. 1 and 2. After the tangs 22 pierce the outer side of the wall 17 so as to hold the anchor structure against movement relative to the wall 17, the bolt 10 is then turned so that the threaded end 23 of the anchor member 19 will be drawn outwardly. This outward movement of the nut 23 will effect a distortion of the body prongs 24, thereby forming laterally projecting arms or clamping members 27 which have forwardly projecting bracing arms 28. The arms 27 and 28 will bend at their ends where they are connected to the cylindrical member 20 and the nut 23, respectively, due to the weakened end portions formed by the annular grooves 26.

Referring to Fig. 4, the anchor bolt 10 is shown in applied position and a hook 29 having a shank 30 is engaged between the head 12 and the flange 21.

Referring now to Fig. 6 there is disclosed a slightly modified form of this invention, wherein the bolt shank 11$^a$ is provided at its forward end with a conical point 31. The point 31 has the base or large diameter thereof of a size equal to the diameter of the shank 11$^a$. A cylindrical hole-cutting member 32 is mounted on the point 31 and includes a fragmentary conical socket member 33 having an annular flange 34 extending from the base or large end thereof. The socket member 33 is adapted to tightly engage about the conical point 31. A cylindrical cutter 35 extends from the flange 34 and is provided with V-shaped prongs or points 36 at the forward or leading end thereof.

Referring now to Fig. 8 there is disclosed another modification of this invention, wherein the bolt shank 11$^b$ is similar to the shank 11$^a$ and has the conical point 31$^b$ similar to the point 31. A hollow cone-shaped member 37 is disposed about the point 31$^b$ and provides a means whereby holes of different diameters may be formed in the wall for permitting the insertion of the anchor bolt through the wall. In other words, the insert for the cap 37 may have its base of predetermined diameter to thereby form an opening through the wall of correct size to permit the ready insertion of the anchor bolt through the opening thus formed.

In the use and operation of this anchor bolt the bolt is assembled as shown in Figs. 1 and 2. The bolt is then driven by means of a hammer or the like, through the wall 17, thereby forming the hole 18 through the wall. After the flange 21 is tightly engaged with the outer side of the wall 17 with the tangs 22 projecting into the wall so as to hold the anchor member against rotation, the bolt 10 may then be rotated so as to move the nut member 23 outward. As the nut member 23 moves outward the distortable body portions 24 will assume the positions shown in Fig. 3. The bolt can be turned sufficiently so that the flange 21 will be firmly and tightly held against the outer side of the wall and the laterally projecting clamping arms 27 will be tightly pressed by the angled arms 28 against the inner side of the wall.

The bolt 11 may then be unthreaded from nut 23, and when point 16 bears against nut 23 point 16 will be loosened and will drop off of the unthreaded reduced diameter inner end 38 of bolt 11. A fixture or other element may be engaged with bolt 11 and the latter rethreaded through nut 23 so as to bind the fixture between head 12 and flange 21.

What is claimed is:

A locknut comprising a bolt having a threaded shank, a head on one end of the shank, means on said one end for rotating said shank, a cylindrical clamping member about said shank, the inner end of said member being threaded on the said shank, the outer end of said member being loose on said shank, said member having a plurality of longitudinally extending circumferentially spaced apart slots therein between the ends thereof, a flange on the outer end of said member, and tangs carried by said flange, said member at the ends of said slots having annular grooves to thereby form weakened portions, that portion of said member between pairs of said slots being laterally distortable upon outward threading of the inner end of said member to thereby bind an element between said flange and the distorted portions of said member drive means comprising a portion larger than said member for forming a hole through an element larger than said member but smaller than said flange for loosely receiving said bolt shank with said member thereon, said means comprising a detachable connection between said opposite end of said shank and at least said portion of said means whereby said locknut may be driven through said element until said flange engages a face thereof whereupon said bolt may be rotated to distort said member and whereby reverse rotation of said bolt may detach at least the said portion of said means.

References Cited in the file of this patent

UNITED STATES PATENTS

| | | |
|---|---|---|
| 2,307,617 | Braun | Jan. 5, 1943 |
| 2,313,616 | Bowersox | Mar. 9, 1943 |
| 2,559,281 | Croessant | July 3, 1951 |
| 2,744,437 | Murphy | May 8, 1956 |
| 2,762,252 | Karitzky | Sept. 11, 1956 |

FOREIGN PATENTS

| | | |
|---|---|---|
| 551,811 | France | Jan. 15, 1923 |
| 130,506 | Switzerland | Feb. 16, 1929 |
| 585,887 | Great Britain | Feb. 27, 1947 |
| 144,117 | Australia | Nov. 6, 1951 |